United States Patent

[11] 3,599,790

[72] Inventor Mariano G. Morey
 Valencia, Spain
[21] Appl. No. 887,148
[22] Filed Dec. 22, 1969
[45] Patented Aug. 17, 1971
[73] Assignee Manufacturas De Precision, S.A.
 Valencia, Spain

[54] APPARATUS FOR THE SELECTION OF FRUITS
 12 Claims, 3 Drawing Figs.
[52] U.S. Cl. ................................................. 209/124,
 221/237
[51] Int. Cl. ................................................. B07c 5/36
[50] Field of Search ................................... 209/122,
 125, 123, 124; 221/237

[56] References Cited
UNITED STATES PATENTS
2,806,403  9/1957  Stucky ........................... 209/124 X
3,422,987  1/1969  Crabb ............................ 221/237 X Primary Examiner—Allen N. Knowles
Attorney—Michael S. Striker ABSTRACT: An open-topped elongated housing comprises an inlet for intermittently admitting articles of fruit from an endless belt onto two adjacent equidirectionally rotating roller members extending longitudinally in the housing. One of the roller members comprises a helical endless channel which accommodates the articles of fruit and, in association with the second roller member, rotates the former for visual inspection and grading and, simultaneously, conveys the same to an outlet of the housing where the articles are sorted according to size.

3,599,790

PATENTED AUG 17 1971

INVENTOR.
MARIANO GUAL MOREY

BY Michael P. Striker

ATTORNEY

APPARATUS FOR THE SELECTION OF FRUITS

BACKGROUND OF THE INVENTION

The present invention relates to an apparatus for sorting and grading articles of fruit in combination with a conveyor belt.

For the sorting and grading of fruit items, the latter usually are transported and received at an inspection location by means of conveyor belts or, in the absence of conveyor belts, are transported to such a location for example by means of crates.

In any event, sorting and grading of fruit items, hitherto, had to be done manually, i.e., for physical and visual inspection of fruit articles it was necessary to manually lift them, for example from a conveyor belt, in order to inspect them on all sides by turning them around and around and, upon inspection and satisfaction as to their given quality and size, put them back on the conveyor belt for further processing or, if unsatisfactory as to their grade or size, dispose of them, for example, by placing them on other belts used for lower grade fruits.

It will be appreciated that the output capacity or productivity of attendants in case of such physical examination of articles of fruit, is relatively low, for one reason, as a result of unavoidable fatigue of the attendant.

SUMMARY OF THE INVENTION

An object of the present invention is to overcome the above disadvantages encountered in grading and sorting of articles of fruit and to provide an apparatus for sorting and grading fruit articles, especially citrus fruits.

A further object of the present invention is to provide a simple apparatus for use in combination with a conveyor belt for sorting and grading articles of fruit and which provides rhythmical rotational movement of the fruits so as to permit complete visual inspection of the same, and which further provides a simple manner for automatically sorting such articles according to size.

A still further object of the present invention is to provide at least one such apparatus or a plurality of the same and which, in combination with an endless belt, substantially increases the output production in grading and sorting of fruits, reduces the costs of such production and, moreover, are economical as regards their construction and use.

Such a combination of a fruit sorting and grading apparatus and a conveyor belt comprises endless conveyor means mounted for travel in a predetermined direction and having a surface at least a marginal zone of which is inclined transversely to the predetermined direction of travel and adapted to carry individual articles of fruit; retaining means having at least one gap and extending along an outer edge of the marginal portion of the surface of the conveyor means for normally retaining the articles of fruit against the marginal portion; and combined sorting and grading members including at least one housing having an inlet communicating with the gap in the retaining means and dimensioned to receive articles of fruit which are carried on the marginal zone of the surface of the conveyor means, a closure member intermittently closing the inlet so that such articles of fruit are compelled to enter at least one at a time, and engaging members engaging articles of fruit entering through the inlet, rotating the articles for visual inspection by an attendant, and sorting the articles according to size.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
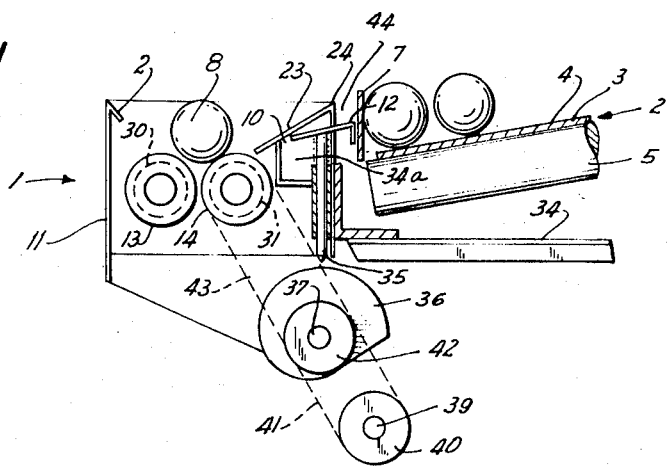
FIG. 1 shows a transverse diagrammatic view of the apparatus according to the present invention.
Figure 2:
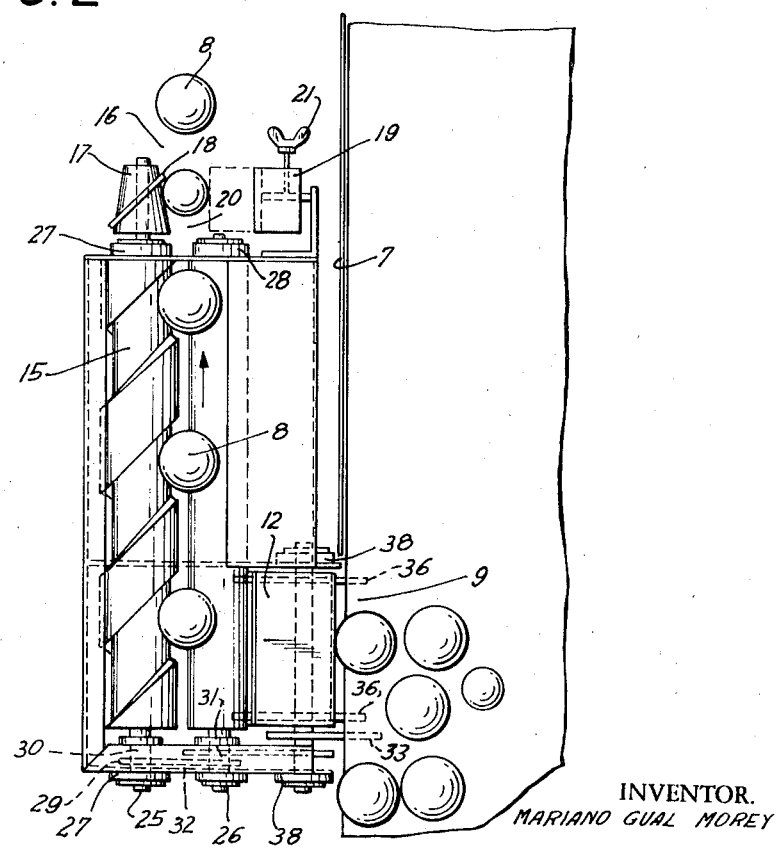
FIG. 2 shows a diagrammatic view of the top of the apparatus of FIG. 1.

Referring now to the drawings in which like reference numerals index like parts and with attention initially drawn to FIGS. 1 and 2, the fruit sorting and grading apparatus, generally indicated at 1, is seen to be associated and coupled to an endless conveyor, generally indicated at 2, and which comprises a belt 3 having an upper surface 4, and support rollers 5 for moving and supporting the belt 3 in a predetermined direction of travel relative to the apparatus 1.

The belt 3 is downwardly inclined towards the apparatus 1 and includes a marginal portion 6 having a retaining edge 7 for retaining articles of fruit 8 on the belt 3. The retaining edge 7 is provided with a plurality of spaced-apart gaps 9 through which, periodically, and at a rate of one at a time, the articles of fruit 8 are compelled to enter the apparatus 1 via an inlet section 10 in the former.

The apparatus 1 in combination sorts and grades articles of fruit and to this end is seen to essentially comprise an elongated housing 11 including the inlet section 10 which communicates with the gaps 9 of the belt 3, a closure member 12 for intermittently closing the inlet section 10, and first and second equidirectionally rotatable rollers 13, 14, with the roller 13 being provided with a helically extending channel 15 in which the fruits 8, upon being admitted into the apparatus 1, are received and, in association with the second roller 14, are rotatably forwarded towards the outlet section 16 of the apparatus. Rotation of the fruits between the inlet section 10 and outlet section 16 permits an attendant to visually inspect or examine the fruits.

The outlet section 16 is seen to comprise a cone-shaped member 17 coupled to the roller 13 and having a discharge channel 18 which has the same pitch as the channel 15 of the roller 12, and a semicircular plate member 19. The plate member 19 and the cone-shaped member 17 together define a gap 20 which serves to sort the fruits according to size, i.e. the plate member 19 is adjustable by means of a screw member 21 so as to adjust the width between the cone-shaped member 17 and the plate member 19, such that fruits smaller than or corresponding to the width of the gap 20 are compelled to fall down, for example onto another belt conveyor or in a container, while fruits larger than the width of the gap 20 are compelled to travel toward the extreme end of the cone-shaped member 16 where they leave the channel 18 and are received in a further container, or the like.

In detail, the housing 11, made of cold laminated steel sheet, is seen to be configurated as a rectangular prismatic box which is open at its upper end. This upper end is provided with inwardly folded edges 22, 23 to eliminate any protruding rims which might damage the fruits. The edge 23, in addition, is pivotable about a pivot axis 24 for reasons as will hereinafter be explained.

The rollers 13, 14 extend longitudinally and parallel but in slightly spaced-apart relationship in the housing 1 and parallel with the belt 3.

In effect, the rollers 13, 14 are constituted by two hexagonal shafts 25, 26 which, at axially opposite ends of the housing 11, are rotatably secured to the latter by means of punch-pressed bearings 27 and 28. The rollers 13, 14 are mounted on these shafts 25, 26 within the confines of the housing 1. The roller 13 is made of cast aluminum and has the helicoidally extending channel 15 in which fruit, of any size, can be lodged. The second roller 14, however, is plane and of a smaller diameter than the roller 13.

The shafts 25, 26 are coupled to each other by a drive 29 formed by sprockets 30, 31 and a chain 32 so that both rollers rotate equidirectionally and at the same speed.

The inlet section 10, as shown, is provided at the forward or fruit-receiving end of the housing 11 which, at this end and by means of support brackets 33, is detachably mounted to the conveyor structure or belt support 34.

The inlet section 10 is formed with a compartment 34a which, initially, accommodates the fruits 8 upon their entry into the apparatus 1 via the closure member 12, which in effect is a cam-operated up and downwardly slidable hatch.

To this end, the closure member 12 is integral with two vertical spaced-apart support rods 35 whose lower end is engaged by a pair of cams 36 which are mounted on a rotatable shaft 37 whose outer ends are supported in punch-pressed bearings 38 welded to the housing 11.

A conventional motor shaft 39, which may also drive the belt 3, is mounted longitudinally beneath the housing 11 and the belt 3.

Mounted on the shaft 39 is a sprocket 40 which, by means of a chain 41, is coupled to a double sprocket 42 mounted on the cam shaft 37 in order to drive the latter and thereby rotate the cams 36 at a predetermined desired speed.

The double sprocket 42, in turn, and by means of a chain 43, is coupled to the sprocket 31 which, likewise, is a double sprocket and is mounted on the shaft 26 of the roller 14. The sprocket 31 is coupled to the sprocket 29 via the chain 32 and, as a result of this coupling arrangement, rotational movement is transmitted from the double sprocket 42 to the rollers 13 and 14 and the cone-shaped member 17 coupled to the shaft 25 of the roller 13.

Operation of the fruit sorting and grading apparatus 1 is quite simple. Fruit deposited on the inclined belt surface 4 is retained thereon by the upstanding edge or retaining member 7 and engages the same.

Through the gaps 9, the fruits 8 are permitted to enter the apparatus 1 via the vertically sliding hatch 12 with the latter in downward position. Upon initially being accommodated in the compartment 34 of the inlet section 10, the fruits are then pushed from the former onto the rollers 13, 14 and into the channel 15. This pushing action is established by the upper slanting surface 44 of the hatch 12 upon upward movement of the same during which it engages the fruit accommodated in the compartment 34.

In turn, the fruit engages the movable portion 23 which, about pivot point 24, swings upwardly to permit passage of the fruit towards the rollers 13 and 14.

On the rollers, the fruits are compelled to rhythmically turn around and around as a result of the rotation of the two rollers. This rotation of the fruits permits visual inspection of the same without the necessity of having to be touched by the attendant.

Simultaneously, the fruits are conveyed toward the outlet section 16 where they, automatically, and as hereinbefore explained, are sorted according to size.

The movement of the rollers 13, 14 and that of the hatch door 12 is accurately synchronized so that the cams 36 make a complete turn at the same time as the rollers thus ensuring constant entry of the fruits into the apparatus 1 and constant advancing of the former in the latter according to a predetermined order and at a rhythm which may be varied by varying the drive arrangement by means of any conventional system.

Mechanical attachment of the apparatus 1 to a conveyor already in use, or any other type of sorting table, does not represent any problem whatsoever for the reason that the brackets 9 are adjustable and can easily be made to fit any type of table of conveyor.

Also, the relative dimensions of the apparatus 1 may be varied as desired depending on the application for which the apparatus is used.

Figure 3:
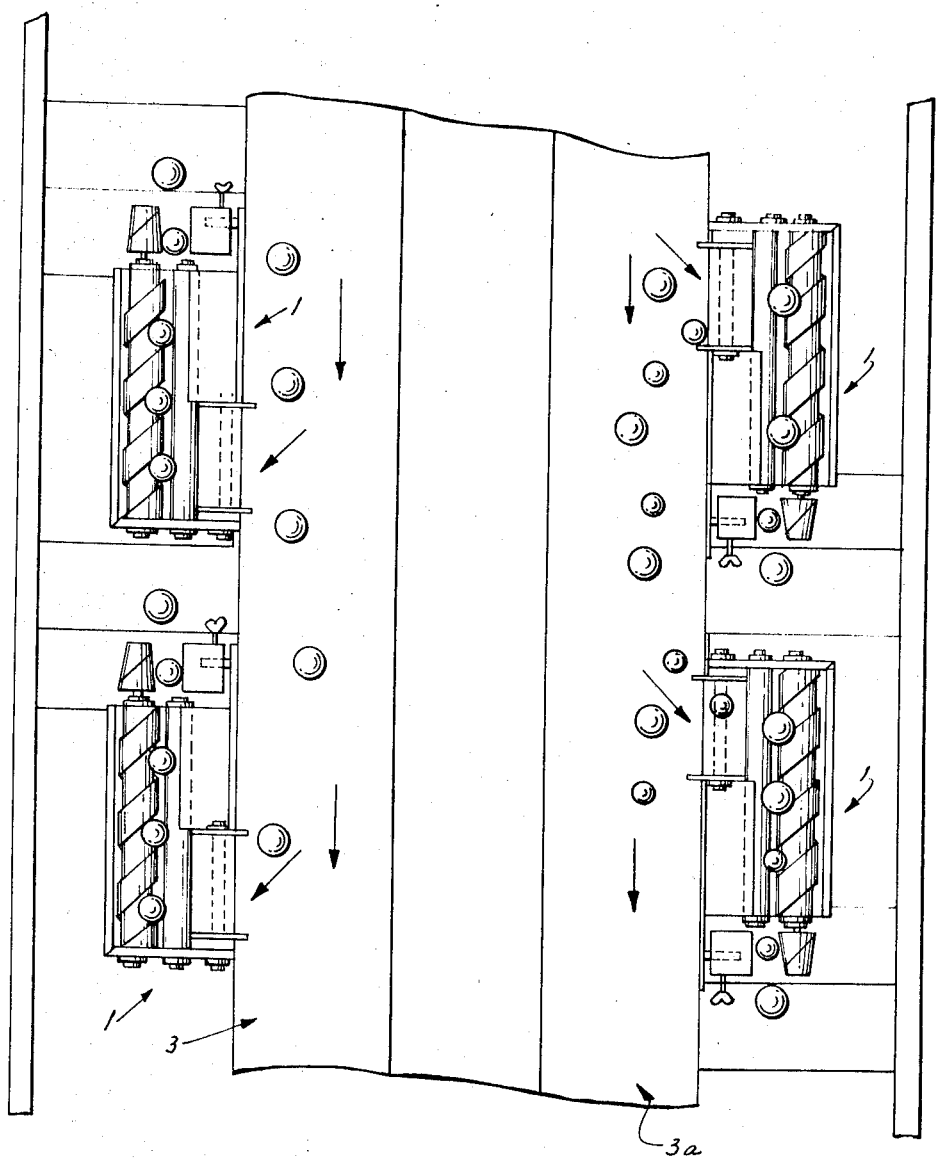
FIG. 3 shows a sectional plan view of an endless sorting belt incorporating a plurality of apparatus identical with the one shown in FIG. 1.

In one practical embodiment, and as shown in FIG. 3, a plurality of apparatus as shown in FIGS. 1 and 2 are mounted on both sides of a conveyor, parallel with the belt 3 which, at its opposite marginal portions 3, 3a, slants downwardly towards the identical apparatus 1. Operation of this arrangement is the same as that described with reference to the apparatus of FIGS. 1 and 2.

The embodiment shown in FIG. 3 has the advantage that the total number of fruits passing on the belt 3 can be calculated by dividing the fruits on the belt by the number of apparatuses 1 coupled to the belt.

It has been found that this means a total production increase of about 88 percent, either in the quantity of sorted and graded fruit or in the labor reduction in obtaining the same production.

It will be understood that each of the elements described above, or two or more together, may also find a useful application in other types of apparatus for sorting and grading articles of fruit differing from the types described above.

While the invention has been illustrated and described as embodied in the apparatus for sorting and grading articles of fruit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention, and therefore such adaptations should and are intended to be comprehended within the meaning and range of equivalence of the following claims.

What I claim as new and desired to be protected by Letters Patent is set forth in the appended claims:

1. In a fruit sorting and grading apparatus, in combination, endless conveyor means mounted for travel in a predetermined direction and having a surface at least a marginal zone of which is inclined transversely to said predetermined direction and adapted to carry individual articles of fruit; retaining means extending along an outer edge of said marginal portion of said surface for normally retaining articles on said marginal portion, said retaining means having at least one gap; and combined sorting and grading means including at least one housing having an inlet communicating with said gap and dimensioned to receive articles of fruit which are carried on said marginal zone, closure means intermittently closing said inlet so that such articles of fruit are compelled to enter at least one at a time, and engaging means engaging articles of fruit entering through said inlet, rotating said articles of fruit for visual inspection by an attendant, and sorting said articles of fruit according to size.

2. In an apparatus as defined in claim 1, wherein said housing has an open top and is substantially elongated and comprises a first closed end adjacent to said inlet and said closure means and a second axially opposite substantially open end, and wherein said engaging means comprises first and second adjacent roller elements extending longitudinally within said housing and together defining an intake end accommodated in said first end of said housing and operative for receiving said articles of fruit from said inlet, a discharge end outwardly directed from said second end of said housing and having means for sorting and discharging said articles form said apparatus, and comprising means intermediate said intake end and said discharge end for rotating said articles and simultaneously advancing the same from said intake end to said discharge end.

3. In an apparatus as defined in claim 2, wherein said first and second roller elements extend parallel in slightly spaced-apart relationship relative to each other and are equidirectionally rotatably mounted in said housing at said first and second ends thereof, and wherein said first roller element is a worm conveyor, and wherein said rotating and transporting means is a helical thread carried by said worm conveyor and constituting a channel for accommodating, rotating and advancing said articles of fruit in association with said second roller member, said second roller member being smaller in diameter than said first roller element.

4. In an apparatus as defined in claim 2, wherein said inlet constitutes an opening through the sidewall of said housing adjacent to said first end thereof and comprises a lower edge portion substantially level with said marginal portion of said conveyor means, and wherein said closure means constitutes a vertically extending up and downwardly shiftable cam-operated hatch intermittently opening and closing said opening.

5. In an apparatus as defined in claim 4, wherein said hatch comprises a pair of spaced rod members operatively engaging a pair of cams for shifting said hatch to open and close said opening, and comprises a tilting top portion downwardly slanting in direction toward said first and second roller elements, said top portion being operative for engaging said articles of fruit upon entry of the same in said apparatus via said opening and for transferring said articles from said opening onto said roller elements.

6. In an apparatus as defined in claim 5, wherein said opening comprises a compartment adjacent to said roller elements and operative to initially receive and accommodate said articles of fruit entering said apparatus, and wherein said top portion of said hatch is movable in said compartment between a first open position in which it is located beneath said articles accommodated in said compartment, and a second closing position in which it moves said articles out of said compartment and onto said roller elements.

7. In an apparatus as defined in claim 6, wherein said compartment comprises an up and downwardly movable lid normally closing said compartment but opening the same upon engagement with said articles of fruit during transfer of the same from said compartment onto said roller elements.

8. In an apparatus as defined in claim 1, wherein said housing is a rectangular prismatic elongated box.

9. In an apparatus as defined in claim 3, wherein each of said roller elements are mounted on a hexagonal shaft rotatably mounted on said housing and equidirectionally driven by a drive arrangement coupled to said shafts, and wherein said means for sorting and discharging said articles from said apparatus comprises a substantially cone-shaped member rotatably mounted on said shaft mounting said first roller element at said discharge end thereof, and an arcuately shaped abutment member adjacent to and cooperating with said cone-shaped member, said cone-shaped member and said abutment member together defining a predetermined gap therebetween for sorting said articles of fruit according to size, and said abutment member being adjustable relative to said cone-shaped member so as to vary the width of said gap.

10. In an apparatus as defined in claim 3, wherein said cone-shaped member carries a helical thread corresponding to said thread of said worm conveyor and constituting a channel for guiding said articles of fruit.

11. In an apparatus as defined in claim 9, wherein said drive arrangement comprises a first sprocket mounted on said shaft mounting said first roller element, a second double sprocket mounted on said shaft mounting said second roller element, and a chain interconnecting said first and second sprockets for equidirectionally rotating said shafts and thereby said roller elements, and wherein a second drive arrangement is coupled between said second double sprocket and two cam members operating said closure means.

12. In an apparatus as defined in claim 11, wherein said two cam members are interconnected by a cam shaft, and wherein said second drive arrangement comprises a double sprocket mounted on said cam shaft, a first chain interconnecting said double sprocket mounted on said second roller element shaft and said double sprocket on said cam shaft for driving said first and second roller elements, and a second chain interconnecting said cam shaft and a motor shaft coupled to a motor for driving said motor shaft and thereby said cam shaft and said cams, said cams being operative to alternatingly open and close said closure means relative to said inlet in response to rotation of said cams.